United States Patent
Strong et al.

(10) Patent No.: US 10,520,974 B2
(45) Date of Patent: Dec. 31, 2019

(54) CLOCK DISTRIBUTION SYSTEM

(71) Applicants: Joshua A. Strong, Columbia, MD (US); Anna Y. Herr, Ellicott City, MD (US); Quentin P. Herr, Ellicott City, MD (US); Steven B. Shauck, Crofton, MD (US)

(72) Inventors: Joshua A. Strong, Columbia, MD (US); Anna Y. Herr, Ellicott City, MD (US); Quentin P. Herr, Ellicott City, MD (US); Steven B. Shauck, Crofton, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 958 days.

(21) Appl. No.: 14/746,377

(22) Filed: Jun. 22, 2015

(65) Prior Publication Data

US 2016/0370822 A1 Dec. 22, 2016

(51) Int. Cl.
- *G06F 1/10* (2006.01)
- *G06F 1/04* (2006.01)
- *G06F 1/32* (2019.01)
- *G06F 1/03* (2006.01)
- *G06F 13/42* (2006.01)

(52) U.S. Cl.
CPC ............ *G06F 1/10* (2013.01); *G06F 1/04* (2013.01); *G06F 1/0321* (2013.01); *G06F 1/32* (2013.01); *G06F 13/4243* (2013.01)

(58) Field of Classification Search
CPC .......... G06F 13/4243; G06F 1/04; G06F 1/10; G06F 1/32; G06F 1/0321

USPC .................................. 713/400, 500, 600
See application file for complete search history.

(56) References Cited

U.S. PATENT DOCUMENTS

| | | | |
|---|---|---|---|
| 5,990,721 A | 11/1999 | Mellitz | |
| 6,098,176 A * | 8/2000 | Coteus | G06F 1/10 |
| | | | 713/400 |
| 6,563,357 B1 | 5/2003 | Goulette | |
| 6,563,358 B1 | 5/2003 | Goulette | |
| 9,722,589 B1 | 8/2017 | Talanov et al. | |

(Continued)

FOREIGN PATENT DOCUMENTS

WO 20160209387 A1 12/2016

OTHER PUBLICATIONS

A High-Frequency Clock Distribution Network Using Inductively Loaded Standing-Wave Oscillators (Year: 2009).*

(Continued)

*Primary Examiner* — Ji H Bae
(74) *Attorney, Agent, or Firm* — Tarolli, Sundheim, Covell & Tummino LLP (57) ABSTRACT

One embodiment includes a clock distribution system. The system includes a standing-wave resonator configured to receive and to resonate a sinusoidal clock signal. The standing-wave resonator includes at least one anti-node portion associated with a peak current amplitude of the sinusoidal clock signal. The system also includes at least one clock line interconnecting each of the at least one anti-node portion and an associated circuit. The at least one clock line can be configured to propagate the sinusoidal clock signal for timing functions associated with the associated circuit.

19 Claims, 4 Drawing Sheets

(56) References Cited

U.S. PATENT DOCUMENTS

| | | | | |
|---|---|---|---|---|
| 2005/0057286 A1* | 3/2005 | Shepard | ................... | G06F 1/10 327/141 |
| 2007/0285179 A1 | 12/2007 | Ikeda et al. | | |
| 2009/0146748 A1* | 6/2009 | Pernia | ..................... | H03B 5/04 331/109 |
| 2014/0210518 A1* | 7/2014 | Chang | ................. | H03K 19/096 326/93 |

OTHER PUBLICATIONS

International Search Report for corresponding PCT/US2016/031755, dated Sep. 27, 2016.

CHI: "Salphasic Distribution of Clock Signals for Synchronous Systems"; IEEE Transactions on Computers, IEEE Service Center, Los Alamitos, CA, US, vol. 43, No. 5, May 31, 1994, pp. 597-602; CP000442053; ISSN 00189340, DOI: 10.1109/12.280806; p. 601, col. 2, lines 4-12.

Japanese Office Action corresponding to Japanese Application No. 2017-562039 dated Dec. 25, 2018.

European Examination Report corresponding to EP Patent Application No. 16 726 447.2-1206 dated Apr. 25, 2019.

International Written Opinion and Search Report corresponding to International Application No. PCT/US2018/058243 dated Jan. 30, 2019.

Herr, Q. et al: "Ultra-Low-Power 1-20 Superconductor Logic," arxiv.org, Cornell University Library, 201 Olin Library Cornell University Ithaca, NY 14853, Mar. 22, 2011 (Mar. 22, 2011) the whole document.

International Search Report corresponding to International Application No. PCT/US2019/018396 dated Apr. 25, 2019.

Chi V L. "Salphasic Distribution of Clock Signals for Synchronous Systems", IEEE Transactions on Computers, IEEE Service Center, vol. 43, No. 5, May 1, 1994.

Korean Office Action for Application Serial No. 10-2017-7037126 dated May 29, 2019.

* cited by examiner

CLOCK DISTRIBUTION SYSTEM

TECHNICAL FIELD

The present invention relates generally to computer systems, and specifically to a clock distribution system.

BACKGROUND

Typical circuits that implement logic functions can operate based on a clock to synchronize data and/or provide a time-based flow of the logic functions. Circuits that are based on complementary metal-oxide-semiconductor (CMOS) technology can implement a clock to indicate when a given logic circuit or gate is to capture data at one or more inputs for processing or transferring the data to other logic functions. A given clock can thus provide a clock signal to a variety of devices in the circuit to provide the requisite timing information, and thus to substantially synchronize data transfer and timing functions. Other types of circuits can implement clock signals, such as reciprocal quantum logic (RQL) circuits. RQL circuits can implement timing information based on a clock that is provided, for example, as a sinusoidal signal having a substantially stable-frequency.

SUMMARY

One embodiment includes a clock distribution system. The system includes a standing-wave resonator configured to receive and to resonate a sinusoidal clock signal. The standing-wave resonator includes at least one anti-node portion associated with a peak current amplitude of the sinusoidal clock signal. The system also includes at least one clock line interconnecting each of the at least one anti-node portion and an associated circuit. The at least one clock line can be configured to propagate the sinusoidal clock signal for timing functions associated with the associated circuit.

Another embodiment includes a clock distribution system. The system includes a standing-wave resonator configured to receive and to resonate a sinusoidal clock signal. The standing-wave resonator includes at least one anti-node portion associated with a predetermined length of the standing-wave resonator defined by a current amplitude of the sinusoidal clock signal that is between a predetermined current amplitude threshold associated with the sinusoidal clock signal and a peak current amplitude of the sinusoidal clock signal associated with an absolute anti-node. The system also includes a plurality of clock lines that are each inductively coupled to an associated circuit and to each of the at least one anti-node portion along the predetermined length of the at least one anti-node portion based on a predetermined inductance associated with each individual one of the plurality of clock lines based on a distance from the absolute anti-node of the respective at least one of the anti-node portions to provide a substantially equal current amplitude in each of the plurality of clock lines. The plurality of clock lines can be configured to propagate the sinusoidal clock signal for timing functions associated with the associated circuit.

Another embodiment includes an integrated circuit (IC) chip. The IC chip includes a reciprocal quantum logic (RQL) circuit configured to operate based on an in-phase sinusoidal clock signal and a quadrature-phase sinusoidal clock signal. The IC chip also includes a first standing-wave resonator configured to receive and to resonate the in-phase sinusoidal clock signal. The IC chip also includes a second standing-wave resonator configured to receive and to resonate the quadrature-phase sinusoidal clock signal. The first and second standing-wave resonators each comprising at least one anti-node portion associated with a peak current amplitude of the respective in-phase and quadrature-phase sinusoidal clock signals. The IC chip further includes at least one clock line inductively coupled to the RQL circuit and inductively coupled to each of the at least one anti-node portion of each of the first and second standing-wave resonators. The at least one clock line can be configured to propagate a respective one of the in-phase and quadrature-phase sinusoidal clock signals for timing functions associated with the RQL circuit.

DETAILED DESCRIPTION

The present invention relates generally to computer systems, and specifically to a clock distribution system. The clock distribution system includes at least one standing-wave resonator configured to receive and resonate a sinusoidal clock signal. As an example, the standing-wave resonator can include a first one or more standing-wave resonators configured to receive an in-phase sinusoidal clock signal and a second one or more standing-wave resonators configured to receive a quadrature-phase sinusoidal clock signal. Each of the standing-wave resonators can include at least one anti-node portion that corresponds to a portion of the standing-wave resonator associated with an absolute anti-node corresponding to a peak current amplitude of the sinusoidal clock signal. As an example, the anti-node portion(s) can include a predetermined length of the standing-wave resonator that is associated with a predetermined current amplitude range between the peak current amplitude and an amplitude threshold.

The clock distribution system also includes at least one clock line associated with each of the anti-node portion(s). The clock line(s) can interconnect the anti-node portion(s) and an associated circuit to provide the sinusoidal clock signal to the associated circuit to implement timing functions associated with the circuit. As an example, the associated circuit can be a reciprocal quantum logic (RQL) circuit, and/or the clock line(s) can be inductively coupled to each of the anti-node portion(s) and conductors of the associated circuit to inductively provide the sinusoidal clock signal to the associated circuit. The inductive coupling of the clock line(s) to the anti-node portion(s) can vary in a predetermined manner, such as based on a linear proximity to the absolute anti-node of the sinusoidal clock signal in the anti-node portion (i.e., along the length of the anti-node portion), to provide a substantially equal current amplitude of the sinusoidal clock signal on each of the clock line(s). The variability of the inductive coupling can be based on orientation and/or radial proximity of the clock line(s) relative to the standing-wave resonator. Accordingly, a relative phase of the sinusoidal clock signal at substantially all portions of the associated circuit can be controlled to be approximately equal for improved operation of the associated circuit.

Figure 1:
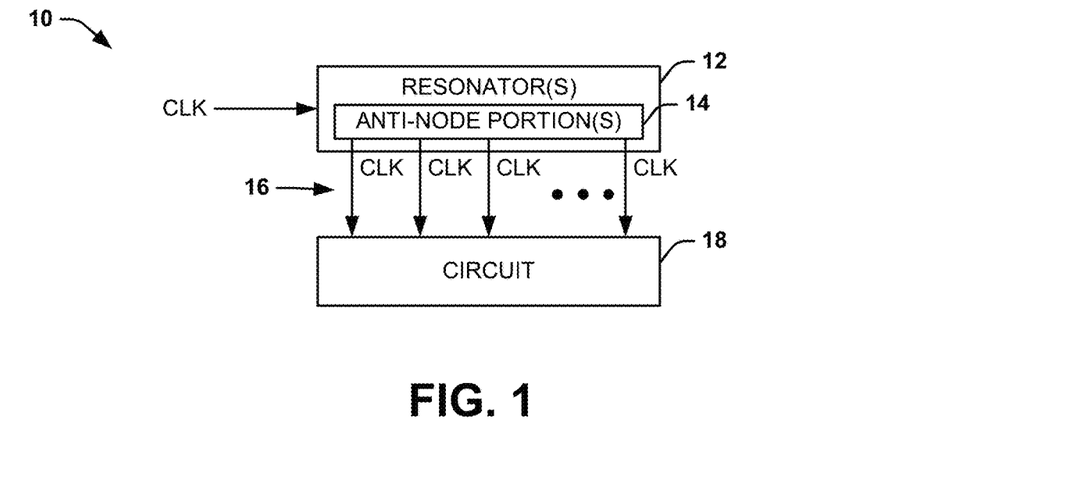
FIG. 1 illustrates an example of a clock distribution system.

FIG. 1 illustrates an example of a clock distribution system 10. The clock distribution system 10 can be implemented in a variety of applications, such as in a reciprocal quantum logic (RQL) circuit design. For example, the clock distribution system 10 can be implemented in or as part of an integrated circuit (IC) chip.

The clock distribution system 10 includes at least one standing-wave resonator 12 that can be configured as a signal transmission line having a physical length that is approximately equal to one half wavelength, one wavelength, or an integer multiple of a wavelength associated with a sinusoidal clock signal CLK. Therefore, the standing-wave resonator(s) 12 are configured to receive and propagate the sinusoidal clock signal CLK such that the sinusoidal clock signal CLK oscillates as a standing wave on the standing-wave resonator(s) 12. As a result, the standing-wave resonator(s) 12 include one or more dedicated anti-node portion(s) 14 associated with an absolute anti-node of the sinusoidal clock signal CLK. For example, the sinusoidal clock signal CLK can be a harmonic sinusoidal signal associated with a wavelength corresponding to a physical length of the standing-wave resonator(s) 12. In other words, the standing-wave resonator(s) 12 can have a physical length that is approximately equal to a multiple of the wavelength of the sinusoidal clock signal CLK, thus resulting in a plurality of anti-node portions 14 that number twice the harmonic of the sinusoidal clock signal CLK (e.g., one peak and one trough for each harmonic).

As described herein, the term "absolute anti-node" describes a portion of a period of the sinusoidal clock signal CLK having a peak current amplitude, which thus corresponds to a static point on the standing-wave resonator(s) 12 that oscillates between a greatest and least current amplitude of the sinusoidal clock signal CLK. Therefore, the term "anti-node portion" with respect to the standing-wave resonator(s) 12 corresponds to a portion of the standing-wave resonator(s) 12 that is associated with an absolute anti-node of the sinusoidal clock signal CLK, such as the static point on the standing-wave resonator(s) 12 associated with the absolute anti-node or a predetermined length of the static-wave resonator(s) 12 that includes the static point on the standing-wave resonator(s) 12 associated with the absolute anti-node. Additionally, as described herein, the term "peak current amplitude" refers to an absolute value peak, and thus refers to a peak amplitude or a trough amplitude, and thus the greatest and least amplitudes of the sinusoidal clock signal CLK.

The clock distribution system 10 also includes a plurality of clock lines 16 that are provided to an associated circuit 18. In the example of FIG. 1, the clock lines 16 each propagate the sinusoidal clock signal CLK to the associated circuit 18, thus enabling the associated circuit 18 to implement timing functions based on the sinusoidal clock signal CLK. As an example, the associated circuit 18 can be an RQL circuit, such that the sinusoidal clock signal CLK can be provided as both an in-phase and a quadrature-phase sinusoidal signal to the associated circuit 18 to implement RQL timing functions. Each of the clock lines 16 can be coupled to a respective one of the anti-node portion(s) 14 along the resonator(s) 12. As an example, the clock lines 16 can be inductively coupled to the resonator(s) 12 and respective conductor(s) associated with the circuit 18. Therefore, the sinusoidal clock signal CLK can have a substantially similar current magnitude along each of the clock lines 16 based on the coupling of the clock lines 16 to the anti-node portion(s) 14. For example, based on an inductive coupling of the each of the clock lines 16 in a respective one of the anti-node portion(s) 16, the sinusoidal clock signal CLK propagating on each of the clock lines 16 can be approximately equal, as described in greater detail herein.

Figure 2:
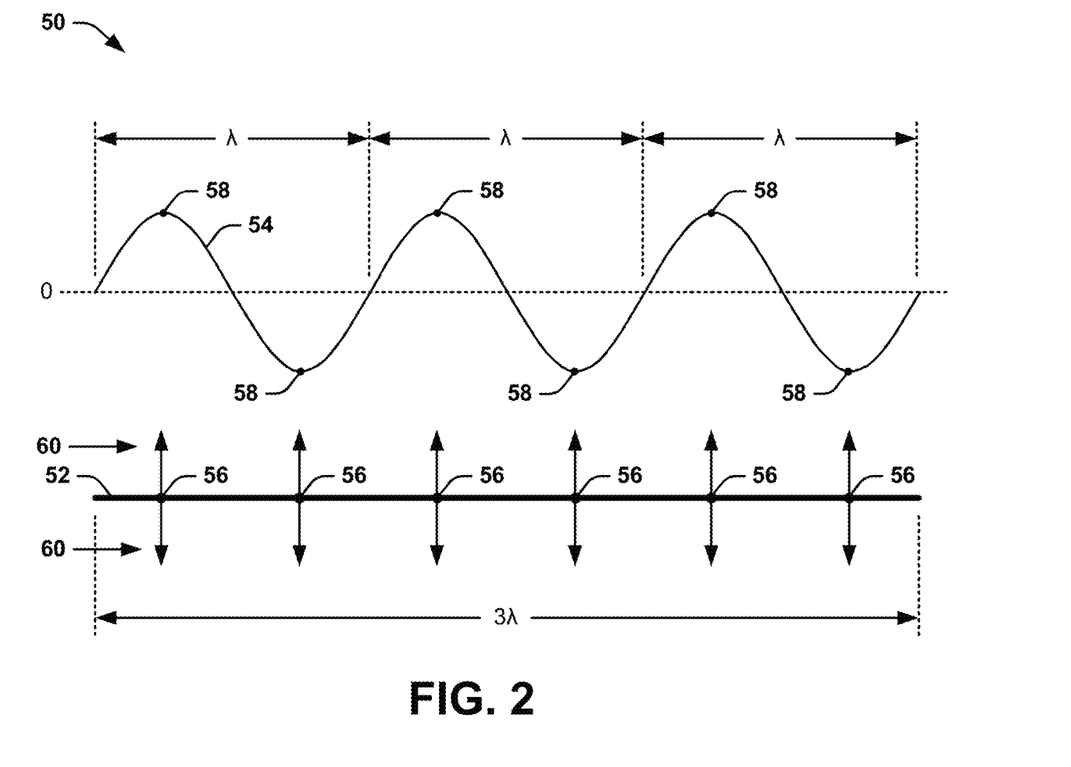
FIG. 2 illustrates an example of a standing-wave resonator system.

FIG. 2 illustrates an example of a standing-wave resonator system 50. The standing-wave resonator system 50 includes a standing-wave resonator 52 that is demonstrated in the example of FIG. 2 as a straight transmission line having a physical length that is approximately equal to three times a wavelength $\lambda$ (e.g., three periods) of a sinusoidal clock signal, demonstrated in the example of FIG. 2 at 54. Thus, the standing-wave resonator 52 has a length of approximately $3\lambda$. The sinusoidal clock signal 54 can be received onto and thus resonate on the standing-wave resonator 52. As an example, the standing-wave resonator 52 can correspond to one of the standing-wave resonator(s) 12 in the example of FIG. 1, such that the sinusoidal clock signal 54 can correspond to the sinusoidal clock signal CLK in the example of FIG. 1.

Because the standing-wave resonator 52 has a physical length of approximately $3\lambda$, the standing-wave resonator 52 includes six anti-node portions 56 that each correspond to six respective absolute anti-nodes 58 of the sinusoidal clock signal 54 arranged at the peaks and troughs of the sinusoidal clock signal 54 (e.g., at $\lambda/2$ intervals with respect to each other). Accordingly, the anti-node portions 56 correspond to points on the standing-wave resonator 52 at which the current amplitude of the sinusoidal clock signal 54 can have approximately the greatest absolute value. In the example of FIG. 2, the standing-wave resonator system 50 also includes a plurality of clock lines 60 that are coupled to and extend from the anti-node portions 56 of the standing-wave resonator 52.

As demonstrated in the example of FIG. 2, the clock lines 60 include a first set of the clock lines 60 extending in a first direction orthogonal to the standing-wave resonator 52 and a second set of the clock lines 60 extending in a second direction orthogonal to the standing-wave resonator 52 at a different orientation relative to the first direction (e.g., the opposite direction). While the clock lines 60 are demonstrated as a pair of clock lines 60 extending from each of the anti-node portions 56, it is to be understood that the standing-wave resonator 52 could have zero, one, or more than two clock lines 60 extending from a single anti-node portion 56. The clock lines 60 are thus each configured to propagate the clock signal 60, such as to the circuit 18, at a current amplitude that corresponds to the peak current amplitude at each of the absolute anti-nodes 58 of the sinusoidal clock signal 54 based on the coupling of the clock lines 60 to the anti-node portions 56 of the standing-wave resonator 52. As an example, the coupling of the clock lines 60 to the anti-node portions 56 of the standing-wave resonator 52 can be an inductive coupling, as described in greater detail herein.

Figure 3:
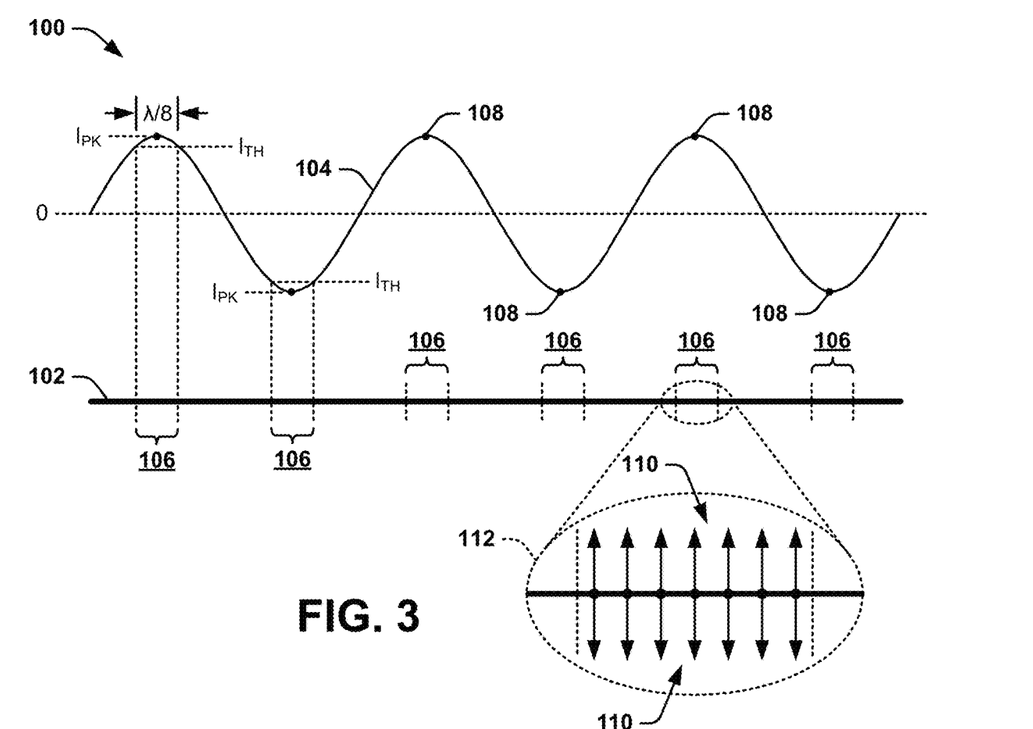
FIG. 3 illustrates another example of a standing-wave resonator system.

FIG. 3 illustrates another example of a standing-wave resonator system 100. The standing-wave resonator system 100 includes a standing-wave resonator 102 that is demonstrated in the example of FIG. 3 as a straight transmission line. Similar to as described previously in the example of FIG. 2, the standing-wave resonator 102 can have a physical length that is approximately equal to three times a wavelength λ (e.g., three periods) of a sinusoidal clock signal 104 on which the sinusoidal clock signal 104 is received and resonates. As an example, the standing-wave resonator 102 can correspond to one of the standing-wave resonator(s) 12 in the example of FIG. 1, such that the sinusoidal clock signal 104 can correspond to the sinusoidal clock signal CLK in the example of FIG. 1.

Because the standing-wave resonator 102 has a physical length of approximately 3λ, the standing-wave resonator 102 includes six anti-node portions 106 that are each associated with six respective absolute anti-nodes 108 of the sinusoidal clock signal 104 arranged at the peaks and troughs of the sinusoidal clock signal 104 (e.g., at λ/2 intervals with respect to each other). In the example of FIG. 3, the anti-node portions 106 extend along a length of the standing-wave resonator 102 and are defined by a current threshold $I_{TH}$ associated with the current amplitude of the sinusoidal clock signal 104. The current threshold $I_{TH}$ can be an absolute value current amplitude that is less than the peak amplitude $I_{PK}$ of the sinusoidal clock signal 104 at the absolute anti-node 108 of the sinusoidal clock signal 104, such that the anti-node portions 106 are defined as lengths of the standing-wave resonator 102 corresponding to portions of the standing-wave resonator 102 at which the current amplitude of the sinusoidal clock signal 104 is between the current threshold $I_{TH}$ and the peak amplitude $I_{PK}$ at the absolute anti-node 108. For example, the amplitude of the current threshold $I_{TH}$ can be defined such that the anti-node portions 106 can have a length of approximately λ/8. Accordingly, the anti-node portions 106 correspond to portions of the standing-wave resonator 102 at which the current amplitude of the sinusoidal clock signal 104 can have approximately the greatest absolute values.

In the example of FIG. 3, the standing-wave resonator system 100 also includes a plurality of clock lines 110 that are coupled to and extend from the anti-node portions 106 of the standing-wave resonator 102, as demonstrated in an exploded-view window 112. Therefore, each of the anti-node portions 106 can have a plurality of clock lines 110 extending therefrom. As demonstrated in the example of FIG. 3, the clock lines 110 include a first set of the clock lines 110 extending in a first direction orthogonal to the standing-wave resonator 102 and a second set of the clock lines 110 extending in a second direction orthogonal to the standing-wave resonator 102 at a different orientation relative to the first direction (e.g., the opposite direction). The clock lines 110 are thus each configured to propagate the clock signal 110, such as to the circuit 18, at current amplitudes that are between the current threshold $I_{TH}$ and the peak amplitude $I_{PK}$ at the absolute anti-node 108 based on the coupling of the clock lines 110 to the anti-node portions 106 of the standing-wave resonator 102. As an example, the coupling of the clock lines 110 to the anti-node portions 106 of the standing-wave resonator 102 can be an inductive coupling. The amount of inductance of the inductive coupling of each of the clock lines 110 in each of the anti-node portions 106 can be based on a physical separation of the respective clock line 110 from the absolute anti-node 108 along the length of the standing-wave resonator 102.

The examples of FIGS. 2 and 3 demonstrate that the standing-wave resonators 52 and 102, respectively, have a length of approximately 3λ of the respective clock signals 54 and 104. However, it is to be understood that the standing-wave resonators described herein, including the standing-wave resonators 52 and 102, are not limited to having a length of 3λ of the clock signal resonating thereon. Thus, as described herein, a standing-wave resonator can have any of a variety of lengths with respect to the wavelength of the clock signal resonating thereon to provide the respective clock signals at locations proximal to the absolute anti-node associated with the respective clock signals.

Figure 4:
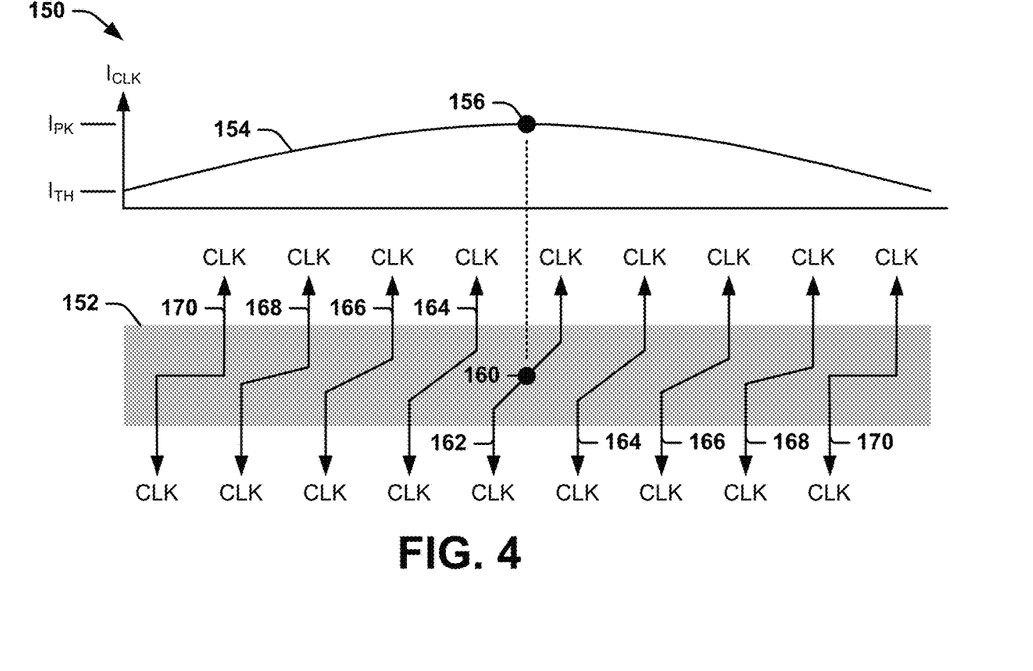
FIG. 4 illustrates an example of an anti-node clock distribution system.

FIG. 4 illustrates an example of an anti-node clock distribution system 150. The anti-node clock distribution system 150 can correspond to a single anti-node portion 152 of a respective standing-wave resonator, such as the standing-wave resonator 102 in the example of FIG. 3. The anti-node clock distribution system 150 demonstrates a current amplitude $I_{CLK}$ of a sinusoidal clock signal 154, such as the sinusoidal clock signal 104 in the example of FIG. 3. Therefore, reference is to be made to the example of FIG. 3 in the following description of the example of FIG. 4.

The anti-node portion 152 is demonstrated in the example of FIG. 4 as a conductor that is a portion of a standing-wave resonator (e.g., the standing-wave resonator 102) that extends axially in both directions. The anti-node portion 152 is defined by a current threshold $I_{TH}$ associated with the current amplitude $I_{CLK}$ of the sinusoidal clock signal 154. The current threshold $I_{TH}$ can be an absolute value current amplitude that is less than the peak amplitude $I_{PK}$ of the sinusoidal clock signal 154 at an absolute anti-node 156 of the sinusoidal clock signal 154, such that the anti-node portion 152 is defined as a length of the respective standing-wave resonator corresponding to a portion of the standing-wave resonator 152 at which the current amplitude $I_{CLK}$ of the sinusoidal clock signal 154 is between the current threshold $I_{TH}$ and the peak amplitude $I_{PK}$ at the absolute anti-node 156. For example, the amplitude of the current threshold $I_{TH}$ can be defined such that the anti-node portion 152 can have a length of approximately λ/8 with respect to the wavelength λ of the sinusoidal clock signal 154. Accordingly, the anti-node portion 152 has a length that is substantially symmetrical about an absolute anti-node portion 160 corresponding to and aligned with the absolute anti-node 156 of the sinusoidal clock signal 154, such as symmetric λ/16 lengths of the respective standing-wave resonator 152 about the absolute anti-node portion 160.

In the example of FIG. 4, the anti-node clock distribution system 150 includes a plurality of clock lines that are each inductively coupled to the anti-node portion 152. The clock lines includes a first clock line 162, a first pair of clock lines 164, a second pair of clock lines 166, a third pair of clock lines 168, and a fourth pair of clock lines 170. The clock lines 162, 164, 166, 168, and 170 are all inductively coupled to the anti-node portion 152 at a variable inductance with respect to each other based on a relative position of the respective clock lines 162, 164, 166, 168, and 170 along the length of the anti-node portion 152. Based on the variable inductive coupling of the clock lines 162, 164, 166, 168, and 170 relative to each other, the amplitude of the sinusoidal clock signal CLK propagated by each of the clock lines 162, 164, 166, 168, and 170 can be approximately equal, and can thus mitigate amplitude-errors that can be associated with different amplitudes of the clock signal CLK provided to different portions of the associated circuit (e.g., the circuit 18).

In the example of FIG. 4, the first clock line 162 is closest in linear proximity to the absolute anti-node portion 160 along the length of the anti-node portion 152. Therefore, the first clock line 162 is demonstrated at an orientation that is least parallel with respect to the anti-node portion 152, and thus has the weakest inductive coupling to the anti-node portion 152 based on being most proximal to the greatest current amplitude $I_{CLK}$ of the sinusoidal clock signal 104 (e.g., the peak amplitude $I_{PK}$). In other words, to maintain an approximately equal amplitude of the clock signal CLK propagating on each of the clock lines 162, 164, 166, 168, and 170, the first clock line 162 has the weakest inductive coupling to substantially normalize the portion of the anti-node portion 152 (e.g., the absolute anti-node portion 160) having the greatest current amplitude $I_{CLK}$ of the sinusoidal clock signal 154 (e.g., the peak amplitude $I_{PK}$). The first pair of clock lines 164 are the next most proximal to the absolute anti-node portion 160, and are thus the next least parallel with respect to the inductive coupling to the anti-node portion 152. Therefore, the first pair of clock lines 164 are more strongly inductively coupled to the anti-node portion 152 relative to the first clock line 162, and are the next weakest with respect to inductive coupling relative to the remaining clock lines 166, 168, and 170.

Similarly, the second pair of clock lines 166 are more parallel, and thus more strongly inductively coupled, to the anti-node portion 152 relative to the first clock line 162 and the first pair of clock lines 164, the third pair of clock lines 168 are more parallel, and thus more strongly inductively coupled, to the anti-node portion 152 relative to the clock lines 162, 164, and 166, respectively, and the fourth pair of clock lines 170 are the most parallel, and thus the most strongly inductively coupled, to the anti-node portion 152 relative to the first clock line 162 and the first pair of clock lines 162, 164, 166, and 168, respectively. Accordingly, to maintain an approximately equal amplitude of the sinusoidal clock signal CLK propagating on all of the clock lines 162, 164, 166, 168, and 170, the inductive coupling of the clock lines 162, 164, 166, 168, and 170 increases at portions of anti-node portion 152 with respect to decreases in current amplitude $I_{CLK}$ of the sinusoidal clock signal 154, respectively. As a result, amplitude-errors in the timing functions of the associated circuit (e.g., the circuit 18) resulting from different amplitudes of the sinusoidal clock signal CLK at different portions of the associated circuit can be substantially mitigated.

Figure 5:
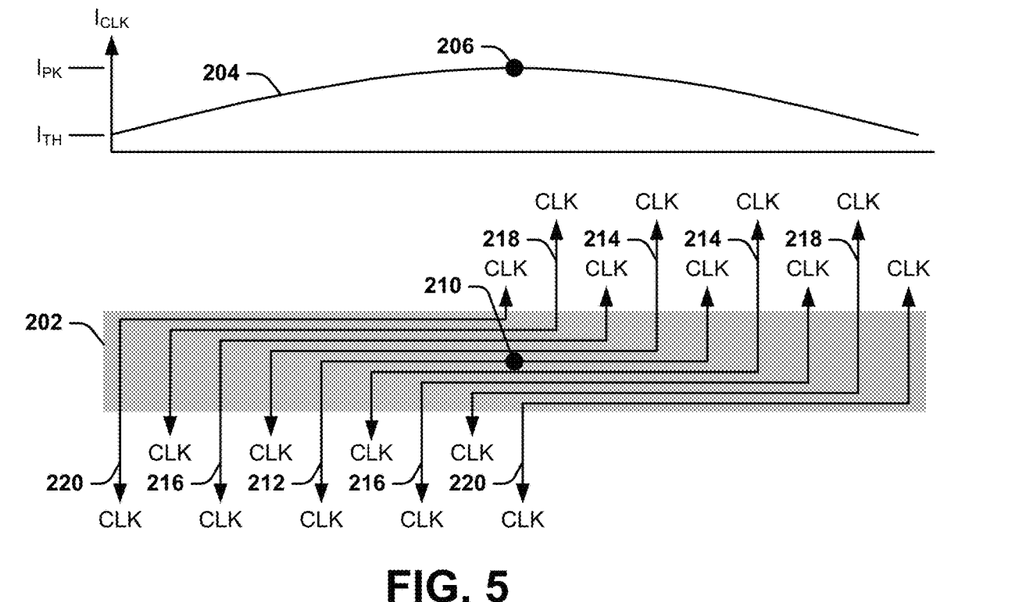
FIG. 5 illustrates another example of an anti-node clock distribution system.

FIG. 5 illustrates another example of an anti-node clock distribution system 200. The anti-node clock distribution system 200 can correspond to a single anti-node portion 202 of a respective standing-wave resonator, such as the standing-wave resonator 102 in the example of FIG. 3. The anti-node clock distribution system 200 demonstrates a current amplitude $I_{CLK}$ of a sinusoidal clock signal 204, such as the sinusoidal clock signal 104 in the example of FIG. 3. Therefore, reference is to be made to the example of FIG. 3 in the following description of the example of FIG. 5.

The anti-node portion 202 is demonstrated in the example of FIG. 5 as a conductor that is a portion of a standing-wave resonator (e.g., the standing-wave resonator 102) that extends axially in both directions. The anti-node portion 202 is defined by a current threshold $I_{TH}$ associated with the current amplitude $I_{CLK}$ of the sinusoidal clock signal 204. The current threshold $I_{TH}$ can be an absolute value current amplitude that is less than the peak amplitude $I_{PK}$ of the sinusoidal clock signal 204 at an absolute anti-node 206 of the sinusoidal clock signal 204, such that the anti-node portion 202 is defined as a length of the respective standing-wave resonator corresponding to a portion of the standing-wave resonator 202 at which the current amplitude $I_{CLK}$ of the sinusoidal clock signal 204 is between the current threshold $I_{TH}$ and the peak amplitude $I_{PK}$ at the absolute anti-node 206. For example, the amplitude of the current threshold $I_{TH}$ can be defined such that the anti-node portion 202 can have a length of approximately $\lambda/8$ with respect to the wavelength $\lambda$ of the sinusoidal clock signal 204. Accordingly, the anti-node portion 202 has a length that is substantially symmetrical about an absolute anti-node portion 210 corresponding to and aligned with the absolute anti-node 206 of the sinusoidal clock signal 204, such as symmetric $\lambda/16$ lengths of the respective standing wave resonator 202 about the absolute anti-node portion 210.

In the example of FIG. 5, the anti-node clock distribution system 200 includes a plurality of clock lines that are each inductively coupled to the anti-node portion 202. The clock lines include a first clock line 212, a first pair of clock lines 214, a second pair of clock lines 216, a third pair of clock lines 218, and a fourth pair of clock lines 220. The clock lines 212, 214, 216, 218, and 220 are all inductively coupled to the anti-node portion 202. In the example of FIG. 5, each of the clock lines 212, 214, 216, 218, and 220 extend substantially parallel along a length of the anti-node portion 202. As an example, the inductive coupling can be approximately equal for each of the clock lines 212, 214, 216, 218, and 220. However, based on the proximity of the clock lines 212, 214, 216, 218, and 220 with respect to each other and with respect to the absolute anti-node portion 208, the current amplitude $I_{CLK}$ of the sinusoidal clock signal CLK propagating in each of the clock lines 212, 214, 216, 218, and 220 could be sufficient to substantially mitigate amplitude-errors associated with the timing functions of the associated circuit (e.g., the circuit 18).

As another example, the clock lines 212, 214, 216, 218, and 220 can have a variable inductance with respect to each other. For example, based on a variable inductive coupling of the clock lines 212, 214, 216, 218, and 220 relative to each other, the amplitude of the sinusoidal clock signal CLK propagated by each of the clock lines 212, 214, 216, 218, and 220 can be approximately equal, and can thus mitigate amplitude-errors that can be associated with different amplitudes of the clock signal CLK provided to different portions of the associated circuit (e.g., the circuit 18). In the example of FIG. 5, the parallel-portion of the first clock line 212 is symmetrically disposed about the absolute anti-node portion 210 along the length of the anti-node portion 202. Therefore, the first clock line 212 can be disposed farthest away in radial proximity (e.g., farthest from a cross-section of the anti-node portion 210) from the anti-node portion 202 to provide the weakest inductive coupling to the anti-node portion 202. Alternatively, the parallel-portion of the first clock line 212 can be shorter in length that the other clock lines 214, 216, 218, and 220 to provide the weakest inductive coupling to the anti-node portion 202.

Thus, similar to as described previously regarding the example of FIG. 4, clock lines 214 can have a next strongest inductive coupling, followed by clock lines 216 with a stronger inductive coupling, followed by clock lines 218 with a stronger inductive coupling, and followed by clock lines 220 with the strongest inductive coupling. The variation of the inductive coupling can be based on the respective clock lines 212, 214, 216, 218, and 220 having respective increasing radial proximity, increasing length of the parallel-portions with respect to the anti-node portion 202, variation in orientation of the respective clock lines 212, 214, 216, 218, and 220 (e.g., similar to as described previously regarding the example of FIG. 4), a combination of factors, or any of a variety of other ways to tune the relative inductance of the respective clock lines 212, 214, 216, 218, and 220 to set the current amplitude $I_{CLK}$ of the sinusoidal clock signal CLK in each of the respective clock lines 212, 214, 216, 218, and 220 to be approximately equal. As a result, amplitude-errors in the timing functions of the associated circuit (e.g., the circuit 18) resulting from different amplitudes of the sinusoidal clock signal CLK at different portions of the associated circuit can be substantially mitigated.

Figure 6:
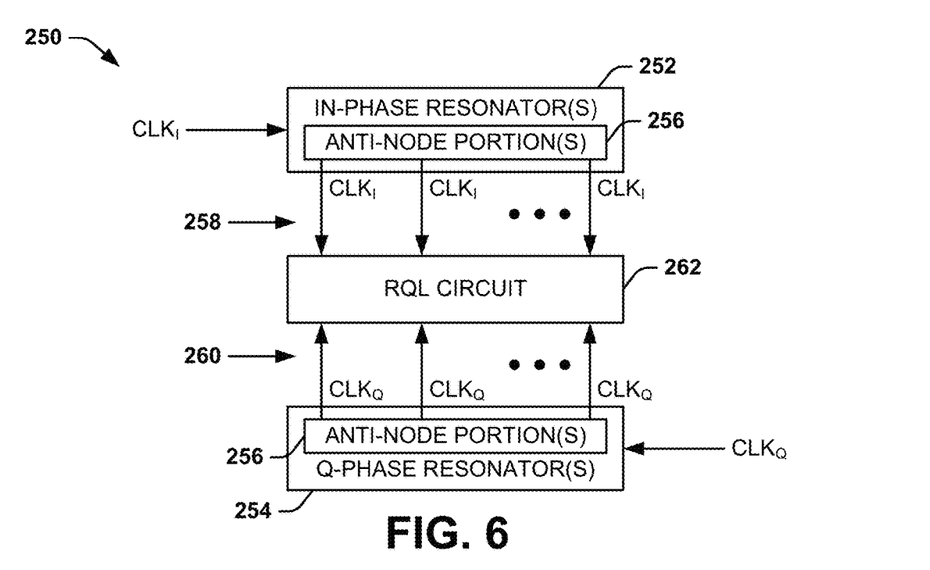
FIG. 6 illustrates another example of a clock distribution system.

FIG. 6 illustrates another example of a clock distribution system 250. The clock distribution system 250 can be implemented in a variety of applications, such as in a reciprocal quantum logic (RQL) circuit design. For example, the clock distribution system 250 can be implemented in or as part of an IC chip.

The clock distribution system 250 includes at least one in-phase standing-wave resonator 252 and at least one quadrature-phase (Q-phase) standing-wave resonator 254 that can be configured as signal transmission lines having a physical length that is approximately equal to one half wavelength, one wavelength, or an integer multiple of a half-wavelength associated with an in-phase sinusoidal clock signal $CLK_I$ and a Q-phase sinusoidal clock signal $CLK_Q$, respectively. For example, the in-phase and Q-phase sinusoidal clock signals $CLK_I$ and $CLK_Q$ can be configured as substantially equal signals with respect to amplitude and frequency, and can be approximately 90° out-of-phase with respect to each other. Therefore, the standing-wave resonators 252 and 254 are configured to receive and propagate the respective sinusoidal clock signals $CLK_I$ and $CLK_Q$ such that the respective sinusoidal clock signals $CLK_I$ and $CLK_Q$ oscillate as standing waves on the standing-wave resonators 252 and 254. As a result, the standing-wave resonators 252 and 254 each include one or more dedicated anti-node portion(s) 256 associated with an absolute anti-node of the respective sinusoidal clock signals $CLK_I$ and $CLK_Q$. For example, the sinusoidal clock signals $CLK_I$ and $CLK_Q$ can be harmonic sinusoidal signals associated with a wavelength corresponding to a physical length of the respective standing-wave resonators 252 and 254. In other words, the standing-wave resonators 252 and 254 can have physical lengths that are approximately equal to a multiple of the half-wavelength of the respective sinusoidal clock signals $CLK_I$ and $CLK_Q$, thus resulting in a plurality of anti-node portions 256 equal to the order of harmonic of the respective sinusoidal clock signals $CLK_I$ and $CLK_Q$ (e.g., one peak or one trough for each harmonic).

The clock distribution system 250 also includes a plurality of in-phase clock lines 258 and Q-phase clock lines 260 that are provided to an associated RQL circuit 262. In the example of FIG. 6, the clock lines 258 and 260 propagate the respective sinusoidal clock signals $CLK_I$ and $CLK_Q$ to the RQL circuit 262, thus enabling the RQL circuit 262 to implement RQL timing functions based on the respective sinusoidal clock signals $CLK_I$ and $CLK_Q$. Each of the clock lines 258 and 260 can be coupled to a respective one of the anti-node portion(s) 256 along the respective standing-wave resonators 252 and 254. As an example, the clock lines 258 and 260 can be inductively coupled to the respective standing-wave resonators 252 and 254, such as described previously in the examples of FIGS. 4 and 5, and to respective conductors associated with the RQL circuit 262. Therefore, the respective sinusoidal clock signals $CLK_I$ and $CLK_Q$ can have a substantially similar (e.g., equal) current magnitude along each of the clock lines 258 and 260 based on the coupling of the clock lines 258 and 260 to the anti-node portion(s) 256.

Figure 7:
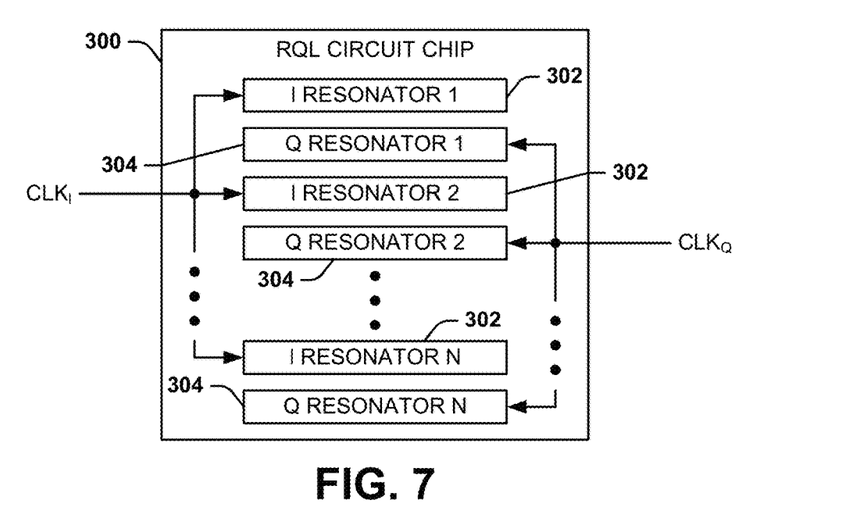
FIG. 7 illustrates an example of a reciprocal quantum logic (RQL) circuit chip.

FIG. 7 illustrates an example of an RQL circuit chip 300. The RQL circuit chip 300 can be a standalone RQL IC chip, or can be part of a larger IC chip that includes additional circuit (e.g., quantum computing) components. As an example, the RQL circuit chip 300 can be fabricated based on any of a variety of circuit fabrication processes, such as to fabricate a plurality of RQL circuit chips 300 via a given one or more material wafers (e.g., such as including semiconductor, metal, and/or dielectric materials).

The RQL circuit chip 300 includes a plurality N of in-phase resonators (I RESONATORS) 302 and a plurality N of quadrature-phase resonators (Q RESONATORS) 304, where N is a positive integer. Each of the in-phase and quadrature-phase resonators 302 and 304 can be configured as standing-wave resonators to receive and resonate respective clock signals, demonstrated in the example of FIG. 7 as an in-phase clock signal $CLK_I$ and a quadrature-phase clock signal $CLK_Q$, respectively, that can each be provided as sinusoidal signals. The in-phase resonators 302 thus receive the in-phase clock signal $CLK_I$ provided at one side of the RQL circuit chip 300 and the quadrature-phase resonators 304 receive the quadrature-phase clock signal $CLK_Q$ provided at an opposite side of the RQL circuit chip 300. The in-phase clock signal $CLK_I$ and the quadrature-phase clock signal $CLK_Q$ are each demonstrated as split inside the RQL circuit chip 300, such that all of the in-phase resonators 302 receives and resonates a substantially identical in-phase clock signal $CLK_I$ and all of the quadrature-phase resonators 304 receives and resonates a substantially identical quadrature-phase clock signal $CLK_Q$.

As an example, each of the in-phase and quadrature-phase resonators 302 and 304 can be configured substantially similar to the standing-wave resonator system 100 in the example of FIG. 3. Thus, each of the in-phase and quadrature-phase resonators 302 and 304 can include at least one anti-node portion to which at least one clock line is coupled. The respective clock lines can thus likewise be coupled (e.g., inductively) to conductors associated with an RQL circuit, such as included in the RQL circuit chip 300. For example, the inductive coupling of the respective clock lines to the anti-node portions of the in-phase and quadrature-phase resonators 302 and 304 can be variable with respect to each other, such that the sinusoidal clock signals $CLK_I$ and $CLK_Q$ can have approximately equal current amplitude on each of the respective clock lines.

In the example of FIG. 7, the in-phase and quadrature-phase resonators 302 and 304 are demonstrated as interdigitated with respect to each other. The quantity N of each of the in-phase and quadrature-phase resonators 302 and 304 can be such that the in-phase and quadrature-phase resonators 302 and 304 can be spread over and extend over substantially all of the RQL circuit chip 300, such as across a given fabrication layer of the RQL circuit chip 300. Therefore, the clock lines associated with each of the in-phase and quadrature-phase resonators 302 and 304 can extend relatively short distances from the respective in-phase and quadrature-phase resonators 302 and 304 to associated RQL circuit components in the RQL circuit chip 300. As a result, based on the relatively short coupling distances of a clock line between the in-phase and quadrature-phase resonators 302 and 304 and associated RQL circuit components, the in-phase and quadrature-phase resonators 302 and 304 can provide the respective clock signals $CLK_I$ and $CLK_Q$ to the associated RQL circuit components in a manner that substantially mitigates phase-errors associated with the respective clock signals $CLK_I$ and $CLK_Q$.

While the example of FIG. 7 demonstrates that a given one of each of the in-phase and quadrature-phase resonators 302 and 304 extends across substantially an entirety of the width of the RQL circuit chip 300, it is to be understood that a plurality of each of the in-phase and quadrature-phase resonators 302 and 304 can extend across the RQL circuit chip 300. Therefore, the in-phase and quadrature-phase resonators 302 and 304 can form a two-dimensional array across a given fabrication layer of the RQL circuit chip 300. Thus, each of the in-phase and quadrature-phase resonators 302 and 304 can receive the respective clock signals $CLK_I$ and $CLK_Q$.

Figure 8:
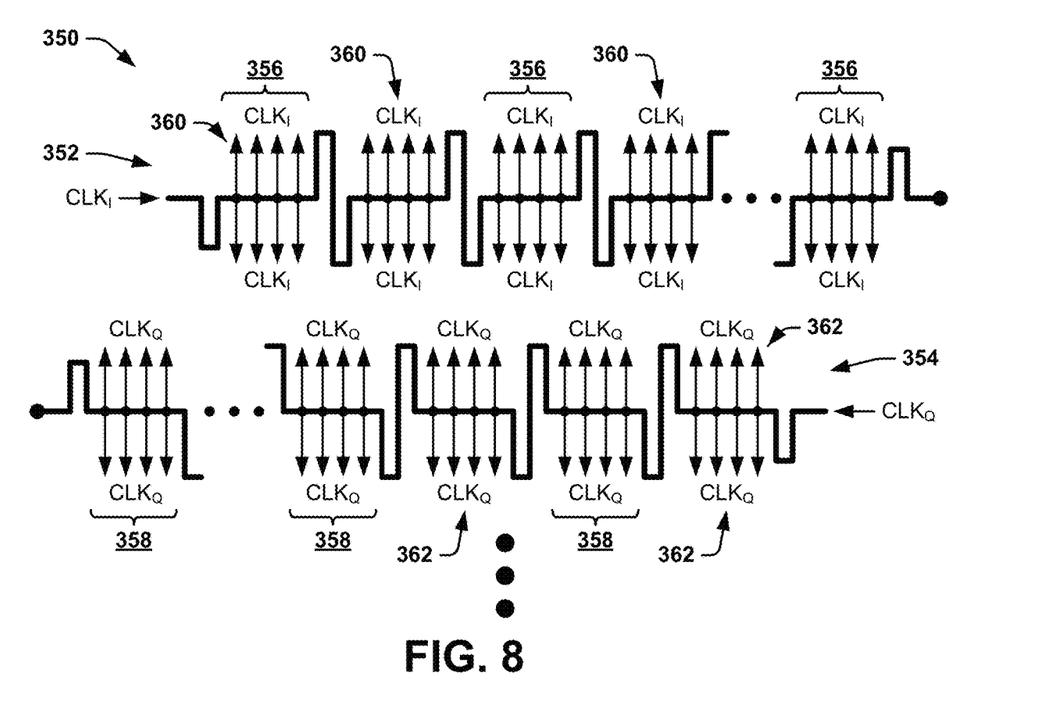
FIG. 8 illustrates yet another example of a clock distribution system.

FIG. 8 illustrates yet another example of a clock distribution system 350. The clock distribution system 350 can be implemented in an RQL circuit design, such as the RQL circuit chip 300 in the example of FIG. 7.

The clock distribution system 350 includes an in-phase standing-wave resonator 352 and a quadrature-phase standing-wave resonator 354 that are each configured as signal transmission lines having a physical length that is approximately equal an integer multiple of a wavelength associated with an in-phase sinusoidal clock signal $CLK_I$ and a Q-phase sinusoidal clock signal $CLK_Q$, respectively. For example, the in-phase and Q-phase sinusoidal clock signals $CLK_I$ and $CLK_Q$ can be configured as substantially equal signals with respect to amplitude and frequency, and can be approximately 90° out-of-phase with respect to each other. In the example of FIG. 8, the in-phase standing-wave resonator 352 and a quadrature-phase standing-wave resonator 354 are each demonstrated as one of a plurality of in-phase standing-wave resonators and quadrature-phase standing-wave resonators. Therefore, additional in-phase standing-wave resonators and quadrature-phase standing-wave resonators can be included in the clock distribution system 350, such as interdigitated with respect to each other, as demonstrated in the example of FIG. 7.

The standing-wave resonators 352 and 354 are configured to receive and propagate the respective sinusoidal clock signals $CLK_I$ and $CLK_Q$ such that the respective sinusoidal clock signals $CLK_I$ and $CLK_Q$ oscillate as standing waves on the standing-wave resonators 352 and 354. As a result, the standing-wave resonator 352 includes a plurality of anti-node portions 356 associated with an absolute anti-node of the sinusoidal clock signal $CLK_I$, and the standing-wave resonator 354 includes a plurality of anti-node portions 358 associated with an absolute anti-node of the sinusoidal clock signal $CLK_Q$. The clock distribution system 350 also includes a plurality of in-phase clock lines 360 extending from the anti-node portions 356 and a plurality of quadrature-phase clock lines 362 extending from the anti-node portions 358. In the example of FIG. 8, the clock lines 360 and 362 propagate the respective sinusoidal clock signals $CLK_I$ and $CLK_Q$, such as to an associated RQL circuit (e.g., the RQL circuit 362). As an example, the clock lines 360 and 362 can be inductively coupled to the respective standing-wave resonators 352 and 354, such as described previously in the examples of FIGS. 4 and 5. Therefore, the respective sinusoidal clock signals $CLK_I$ and $CLK_Q$ can have a substantially similar (e.g., equal) current magnitude along each of the clock lines 360 and 362 based on the coupling of the clock lines 360 and 362 to the anti-node portion(s) 356 and 358.

The anti-node portions 356 and 358 of the respective standing-wave resonators 352 and 354 are demonstrated in the example of FIG. 8 as being substantially collinear with respect to an axis extending along each respective one of the standing-wave resonators 352 and 354, and are thus referred to hereinafter as "collinear anti-node portions". The portions of the standing-wave resonators 352 and 354 between the respective anti-node portions 356 and 358 are demonstrated in the example of FIG. 8 as being substantially non-linear, such that the axis that extends through the collinear anti-node portions 356 and 358 has a shorter distance between the respective collinear anti-node portions 356 and 358 than the length of the portions that interconnect the respective collinear anti-node portions 356 and 358. Alternatively, the portions of standing-wave resonators 352 and 354 between the respective anti-node portions 356 and 358 may be replaced by shunt capacitors to ground to further reduce their size. Therefore, the arrangement of the collinear anti-node portions 356 and 358, as well as the non-linear portions interconnecting the collinear anti-node portions 356 and 358, can result in a substantial optimization of distribution of the respective clock lines 360 and 362. In other words, by arranging the standing-wave resonators 352 and 354 in the manner demonstrated in the example of FIG. 8, the distribution of the clock lines 360 and 362 can be optimized along the length of the standing-wave resonators 352 and 354 to substantially reduce the length of the clock lines 360 and 362 and to provide a sufficient number of the clock lines 360 and 362 along the area of the respective RQL circuit chip. Accordingly, the sinusoidal clock signals $CLK_I$ and $CLK_Q$ can be effectively provided to substantially all portions of the RQL circuit chip in a manner that substantially mitigates amplitude-errors associated with the sinusoidal clock signals $CLK_I$ and $CLK_Q$.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A clock distribution system comprising:
   a standing-wave resonator configured to receive and to resonate a sinusoidal clock signal, the standing-wave resonator comprising at least one anti-node portion associated with a peak current amplitude of the sinusoidal clock signal; and
   at least one clock line inductively coupled to each of the at least one anti-node portion of the standing-wave resonator and to at least one conductor of an associated circuit, the at least one clock line being configured to inductively provide the sinusoidal clock signal for timing functions associated with the associated circuit.

2. The system of claim 1, wherein each of the at least one anti-node portion comprises a predetermined length of the standing-wave resonator defined by a current amplitude of the sinusoidal clock signal that is between a predetermined current amplitude threshold associated with the sinusoidal clock signal and the peak current amplitude associated with an absolute anti-node.

3. The system of claim 2, wherein the at least one clock line comprises a plurality of clock lines coupled to each of the at least one anti-node portion along the predetermined length of the at least one anti-node portion.

4. The system of claim 3, wherein each of the plurality of clock lines is inductively coupled to the at least one anti-node portion at a predetermined inductance magnitude based on a distance from the absolute anti-node along a length of the respective at least one of the anti-node portions to provide a substantially equal current amplitude in each of the plurality of clock lines.

5. The system of claim 4, wherein the predetermined inductance is based on at least one of a radial distance of the respective one of the plurality of clock lines relative to the respective at least one of the anti-node portions and an orientation of the respective one of the plurality of clock lines relative to the respective at least one of the anti-node portions.

6. The system of claim 1, wherein the at least one anti-node portion comprises a plurality of anti-node portions, wherein the sinusoidal clock signal is a harmonic sinusoidal signal associated with a wavelength corresponding to a physical length of the standing-wave resonator, such that each of the plurality of anti-node portions corresponds to each of a respective plurality of peaks associated with the harmonic sinusoidal signal, and wherein each of the plurality of anti-node portions is coupled to at least one clock line.

7. The system of claim 6, wherein each of the plurality of anti-node portions are arranged collinearly with respect to an axis extending along the standing-wave resonator, wherein each portion of the standing-wave resonator between and interconnecting the plurality of anti-node portions is either non-linear or comprises a shunt capacitor that is coupled to ground.

8. The system of claim 1, wherein the at least one clock line comprises a plurality of clock lines coupled to each of the at least one anti-node portion, wherein the plurality of clock lines comprises a first set of clock lines extending in a first direction orthogonal to the respective anti-node portion and a second set of clock lines extending in a second direction orthogonal to the respective anti-node portion and having a different orientation relative to the first direction.

9. The system of claim 1, wherein the associated circuit is a reciprocal quantum logic (RQL) circuit, wherein the sinusoidal clock signal comprises an in-phase sinusoidal clock signal on a first standing-wave resonator and a quadrature-phase sinusoidal clock signal on a second standing-wave resonator, the in-phase and quadrature-phase sinusoidal clock signals being arranged 90° out-of-phase with respect to each other.

10. The system of claim 9, wherein the first standing-wave resonator comprises a plurality of first standing-wave resonators that are each configured to receive the in-phase sinusoidal clock signal and wherein the second standing-wave resonator comprises a plurality of second standing-wave resonators that are each configured to receive the quadrature-phase sinusoidal clock signal, the first and second pluralities of standing-wave resonators being interdigitated with respect to each other.

11. An integrated circuit chip comprising the clock distribution system of claim 1.

12. A clock distribution system comprising:
a standing-wave resonator configured to receive and to resonate a sinusoidal clock signal, the standing-wave resonator comprising at least one anti-node portion associated with a predetermined length of the standing-wave resonator defined by a current amplitude of the sinusoidal clock signal that is between a predetermined current amplitude threshold associated with the sinusoidal clock signal and a peak current amplitude of the sinusoidal clock signal associated with an absolute anti-node; and
a plurality of clock lines that are each inductively coupled to an associated circuit and to one of the at least one anti-node portion at a predetermined inductance magnitude based on a distance from the absolute anti-node along a length of the respective one of the at least one anti-node portion to provide a substantially equal current amplitude in each of the plurality of clock lines, the plurality of clock lines being configured to propagate the sinusoidal clock signal for timing functions associated with the associated circuit.

13. The system of claim 12, wherein the predetermined inductance is based on at least one of a radial distance of the respective one of the plurality of clock lines relative to the respective at least one of the anti-node portions and an orientation of the respective one of the plurality of clock lines relative to the respective at least one of the anti-node portions.

14. The system of claim 12, wherein the at least one anti-node portion comprises a plurality of anti-node portions, wherein the sinusoidal clock signal is a harmonic sinusoidal signal associated with a wavelength corresponding to a physical length of the standing-wave resonator, such that each of the plurality of anti-node portions corresponds to each of a respective plurality of peaks associated with the harmonic sinusoidal signal, and wherein each of the plurality of anti-node portions is coupled to a plurality of clock lines.

15. The system of claim 12, wherein the associated circuit is a reciprocal quantum logic (RQL) circuit, wherein the sinusoidal clock signal comprises an in-phase sinusoidal clock signal on a first standing-wave resonator and a quadrature-phase sinusoidal clock signal on a second standing-wave resonator, the in-phase and quadrature-phase sinusoidal clock signals being arranged 90° out-of-phase with respect to each other.

16. An integrated circuit (IC) chip comprising:
a reciprocal quantum logic (RQL) circuit configured to operate based on an in-phase sinusoidal clock signal and a quadrature-phase sinusoidal clock signal;
a first standing-wave resonator configured to receive and to resonate the in-phase sinusoidal clock signal;
a second standing-wave resonator configured to receive and to resonate the quadrature-phase sinusoidal clock signal, the first and second standing-wave resonators each comprising at least one anti-node portion associated with a peak current amplitude of the respective in-phase and quadrature-phase sinusoidal clock signals; and
at least one clock line inductively coupled to the RQL circuit and inductively coupled to each of the at least one anti-node portion of each of the first and second standing-wave resonators, the at least one clock line being configured to propagate a respective one of the in-phase and quadrature-phase sinusoidal clock signals for timing functions associated with the RQL circuit.

17. The IC chip of claim 16, wherein the first standing-wave resonator comprises a plurality of first standing-wave resonators that are each configured to receive the first sinusoidal clock signal and wherein the second standing-wave resonator comprises a plurality of second standing-wave resonators that are each configured to receive the second sinusoidal clock signal, the first and second pluralities of standing-wave resonators being interdigitated with respect to each other.

18. The IC chip of claim 16, wherein each of the at least one anti-node portion comprises a predetermined length of the respective one of the first and second standing-wave resonators defined by a current amplitude of the respective one of the in-phase and quadrature-phase sinusoidal clock signals that is between a predetermined current amplitude threshold associated with the respective one of the in-phase and quadrature-phase sinusoidal clock signals and the peak current amplitude associated with an absolute anti-node, wherein the at least one clock line comprises a plurality of clock lines coupled along the predetermined length of the at least one anti-node portion.

19. The IC chip of claim 18, wherein each of the plurality of clock lines is inductively coupled to the at least one anti-node portion at a predetermined inductance magnitude based on a distance from the absolute anti-node along a length of the respective at least one of the anti-node portions to provide a substantially equal current amplitude in each of the plurality of clock lines.

\* \* \* \* \*